Oct. 25, 1966 F. M. MANION 3,280,837

VORTEX TRANSFER DEVICE

Filed Nov. 20, 1963

INVENTOR
FRANCIS M. MANION

BY Hurvitz + Rose
ATTORNEYS

United States Patent Office 3,280,837
Patented Oct. 25, 1966

3,280,837

VORTEX TRANSFER DEVICE

Francis M. Manion, Rockville, Md., assignor to Bowles Engineering Corporation, Silver Spring, Md., a corporation of Maryland Filed Nov. 20, 1963, Ser. No. 325,029
12 Claims. (Cl. 137—81.5)

This invention relates generally to a system for transferring fluid between stages of pure fluid amplifying devices, and more specifically, this invention relates to a vortex system for converting linear flow at a first level to vortical flow and then back to linear flow at a second level parallel to the first level; the flow pattern after conversion from vortical flow having no velocity gradient in depth.

Pure fluid amplifiers are so called because all elements forming the amplifier remain stationary during operation thereof and only the working fluid is utilized to effect amplification. Typically, a pure fluid amplifier is formed by a plurality of flat plates secured in a fluid-tight relationship one to the other by adhesives, machine screws or other suitable means, the flat plates cooperating to limit the flow of fluid in the plates to planar flow. The configuration needed to provide a pure fluid amplifier is typically formed in one of the flat plates and another plate covers the one plate, thereby confining the flow to planar flow pattern in that one plate.

Pure fluid amplifiers of the beam deflection type to which the present invention is directed comprise a power nozzle for issuing a power stream from a regulated source of supply fluid, an interaction chamber positioned downstream of the nozzle for receiving the power stream, at least one control nozzle and generally two control nozzles, angularly positioned with respect to the power nozzle and issuing control streams of fluid for effecting amplified directional displacement of the power stream in the interaction chamber, and at least a pair of output tubes or passages positioned downstream of the interaction chamber for receiving varying quantities of fluid from the power stream resulting from the displacement of the power stream by control streams issuing from the control nozzles. Because the power stream is deflected by control streams across the entrances to the output tubes or passages, this type of fluid amplifier is known by those working in the art as a beam deflection type of pure fluid amplifier. The beam deflection type of pure fluid amplifiers can be further subclassified as being either of the stream interaction type such as disclosed in U.S. Patent No. 3,024,805 or the boundary layer type such as disclosed in U.S. Patent No. 3,016,066.

In order to further amplify the gain of one amplifier stage, it has been the practice in the art to interconnect or stage a plurality of amplifiers for achieving increased gain, the staging being effected by coupling the output passages of one stage to the control nozzles of the next stage, the latter stage having larger dimensions than the first stage. Fluid pressure or flow signals issuing from the output passages of the first stage are further amplified by displacing the power stream of the larger second stage in accordance with the principles of pure fluid amplification. Since pure fluid amplifiers are typically of sandwich-type constructions, it is preferable from points of view of compactness and ruggedness that the two or more stages forming the staged amplifying system also have a sandwich-type structure. Such a resulting structure obviously necessitates transferring the linear output flow from the output passage of the first stage to linear flow for use in the control nozzles of the second stage.

One means devised by those skilled in the art for providing transfer of flow from one stage to another contemplates a cylidnrical chamber which communicates with the output passage of the first stage by way of a tangentially positioned ingress port and with the control nozzles of the second stage by way of a tangentially positioned egress port, the axis of the chamber being perpendicular to the planes of flow in the first and second amplifying stages. The chamber essentialy converts linear flow from the first stage to vortical flow and thereafter to linear flow which is supplied to the control nozzles of the second stage. Since the second stage is employed to amplify a fluid parameter such as pressure or flow from the first stage, the nozzles, interaction chamber and the output passages of the second stage are considerably larger than equivalent elements forming the first stage and therefore the dimension of the ingress port parallel to the axis of the chamber and perpendicular to the direction of flow is considerably less than the corresponding transverse dimension of the egress port. This relatively large difference between the dimensions of the ingress and egress ports in the plane transverse to the plane of the amplifiers, however, resulted in the fluid stream issuing into the egress port having an appreciable velocity gradient across the dimension perpendicular to the direction of flow which varies throughout the depth of the fluid stream received by the egress port. The non-uniform velocity generated in the presence of a time varying signal results from many factors. In designing the vortex transfer unit, one attempts to minimize that portion of the fluid in the unit which does not represent a signal of interest at that moment. Specifically, if the vortex chamber contains more fluid than is required to egress from the chamber through the control nozzle of the second stage in response to a signal, then the signal must attempt to accelerate or decelerate an excessive mass of fluid, resulting in a loss of signal level due to averaging. Initially, it would appear that this problem may be overcome by making the transfer unit of a sufficiently small diameter that the unit contains only the quantity of fluid required to provide the fluid flow to the second stage control nozzle. It has been found that this approach cannot be employed since the turning rate in a small diameter unit is quite large and produces large centrifugal forces. The large centrifugal forces produce large losses due to excessive pressure between the fluid and the walls of the unit which may, to a large extent, nullify the gain of the first stage of amplification. Ideally, the vortex chamber should be as large as possible to overcome the above-described problem. However, problems of space and particularly of excessive fluid restricted the size of the chambers in the prior art units.

In accordance with the present invention, the problem of excessive fluid in the vortex chamber is practically eliminated. The chamber is made considerably larger than a chamber designed to hold only that quantity of fluid necessary to produce the desired output signal. In order to reduce the excess quantity of fluid in the chamber, a large cylindrical body may be located along the central axis of the vortex chamber. Such an arrangement allows the use of a large diameter chamber to use the losses due to centrifugal forces in a small unit and at the same time, minimizes the total quantity of fluid in the unit to reduce the inertial losses.

A unit such as described above is superior to the prior art devices but there is still a quantity of fluid in the unit in excess of the quantity required to provide fluid to the control nozzle of the second stage. Specifically, the annulus between the walls of the chamber and the walls of the inner cylinder must be large enough to accept a quantity of fluid sufficient to supply the control nozzle of the second stage. This annulus remains of constant size throughout its length even though the quantity of fluid required to produce the signal decreases along the length of the chamber as fluid egresses throughout the length of the egress passage.

In accordance with a further feature of the present invention, the cylinder is replaced by a truncated cone having its smallest diameter at the ingress passage and its largest diameter at the end remote from the ingress passage. The width of the annulus between the walls of the chamber and the cone at the ingress passage is large enough to accept all of the fluid required to supply the egress passage. The width of the annulus at its other end; that is, at its end most remote from the ingress passage is approximately equal to the width of the egress passage. Thus, the total quantity of fluid which may be accommodated by the vortex chamber is about the same as the total quantity of fluid required to supply the egress passage and losses due to the necessity for accelerating or decelerating excess fluid in the chamber are practically eliminated.

Another feature of the conical shape is that the transit time of signals through the system is reduced without affecting the velocity profile of the egressing signal. The fluid which is adjacent the inner body at the ingress port will be the last to leave the chamber at its remote end and therefore has the longest path to travel. Due, however, to vortex amplification, this innermost fluid has the highest velocity including axial velocity and therefore its transit time through the unit is less than might otherwise be the case. As this fluid travels downwardly, the conical shape of the inner element moves the fluid outwardly reducing its velocity as a function of its outward movement. When the fluid egresses, it does so at the same diameter as the remainder of the fluid so its velocity has been reduced to that of the remainder of the egressing fluid. Thus, the use of the conical shape permits the time delay in the transfer unit but does not appreciably affect the velocity profile.

Broadly, it is an object of this invention to provide a uniform, high-efficiency transfer of planar fluid flow vertically between two parallel flow planes.

More specifically, it is an object of this invention to provide a transfer system for use with a sandwich-type structure of staged fluid amplifiers, the system providing high transfer efficiency and uniform velocity flow from one amplifier stage to a succeeding amplifier stage.

Another object of the present invention is to provide a vortex transfer of fluid between two stacked and generally parallel stages of fluid amplification in which the vortex chamber contains generally only that quantity of fluid required to supply the control nozzle of the second stage of amplification.

The above and still further objects, features and advantages of the present invention will become apparent upon consideration of the following detailed description of one specific embodiment thereof, especially when taken in conjunction with the accompanying drawings, wherein.

Figures 1, 2, 3, 4, 5:
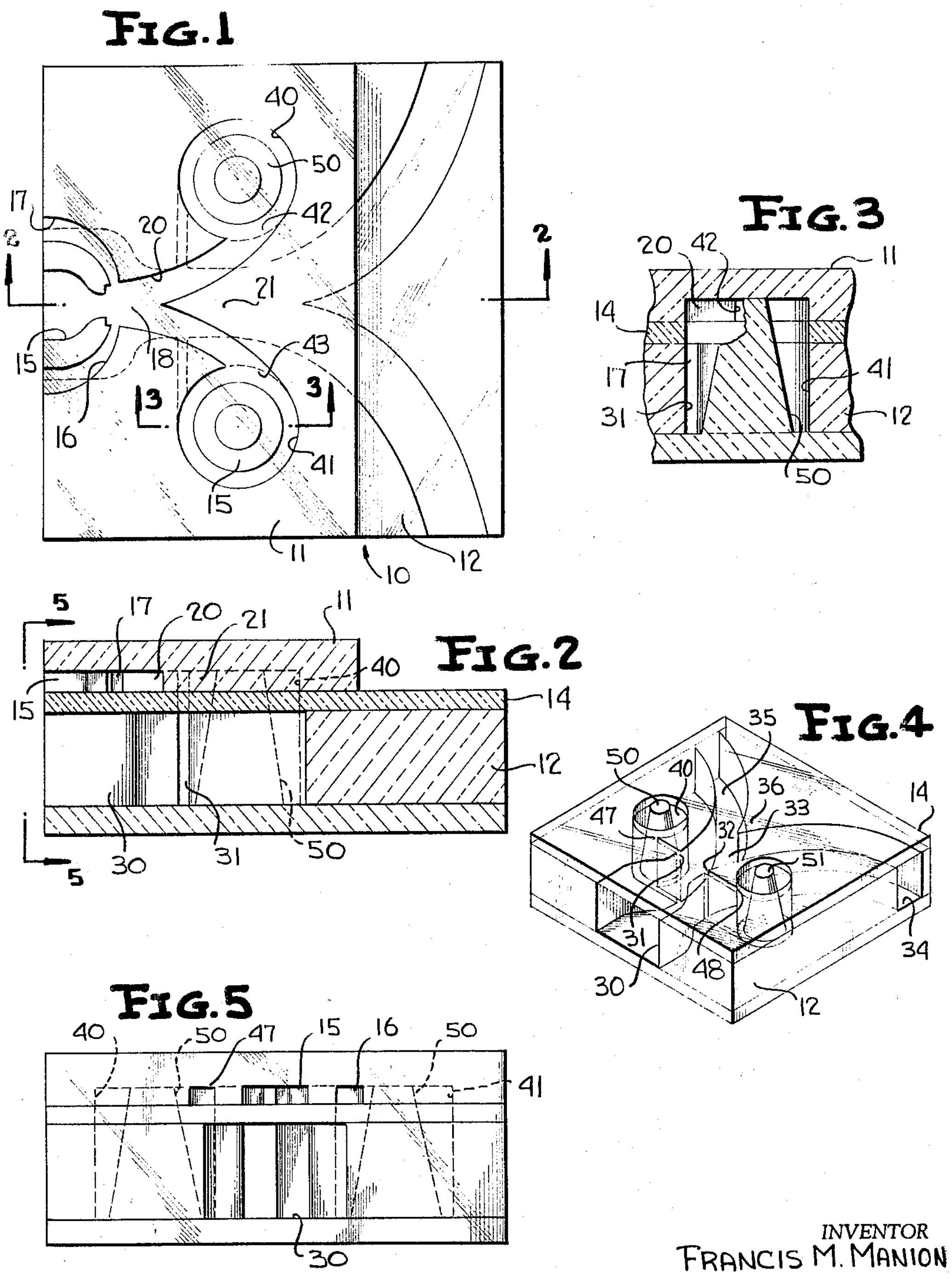
FIGURE 1 is a plan view showing a sandwich-type structure forming a pair of staged fluid amplifiers coupled together by the vortex transfer system of this invention.
FIGURE 2 is a sectional side view taken along section line 2—2 of FIGURE 1.
FIGURE 3 is a sectional side view of the vortex transfer system of this invention taken along section line 3—3 of FIGURE 1 with a portion of the transfer system removed for purposes of clarity.
FIGURE 4 is a perspective view of the second stage of the fluid amplifying system embodying the vortex transfer system of this invention.
FIGURE 5 is an end view of FIGURE 1, taken in the direction of flow input to the staged amplifying system.

According to this invention, a sandwich-type structure incorporating staged fluid amplifiers is coupled by a substantially cylindrical transfer chamber which extends perpendicular to the direction of flow through each stage, the transfer chamber coupling the linear flow output of one stage to the control nozzles of the second stage which is larger than the previous stage. The transfer chamber is provided with a frusto-conical element disposed centrally in the chamber, the surfaces of the element being inclined in the direction of flow from the first to the second stage. The periphery of the conical section defines the center region of the rotating fluid and the distribution of the planar flow issuing tangentially from the chamber into the control nozzle of the second stage, and eliminates the conically shaped low pressure region typically developed in the center of a fluid vortex.

Referring now to the drawings for a more complete understanding of this invention, FIGURE 1 illustrates a two-stage amplfying system designated by the numeral 10, the first stage being designated by the numeral 11 and the second stage by the numeral 12. As is more clearly illustrated in FIGURE 2, the system 10 is composed of flat plates sandwiched together and sealed one to the other by adhesives or equivalent securing means. For purposes of clarity, the plates are shown to be formed of a clear plastic material; however, any material compatible with the fluid employed in the system 10 may be used alternatively.

The first amplifier stage 11 is formed by molding, etching, metal fabrication, or by other suitable techniques.

The amplifier 11 is provided with a power nozzle 15, FIGURE 1, a pair of opposed control nozzles 16 and 17, an interaction chamber 18, and a pair of output passages 19 and 20 for receiving varying quantities of the power stream displaced by control streams issuing from the control nozzles 16 and 17. A flow splitter 21 divides quantities of fluid from the power stream into the entrances of the output passages 19 and 20. The amplifier 11 may be of the stream interaction type or the boundary layer type referred to hereinabove, since the vortex transfer system of this invention may be incorporated in both types of beam deflection amplifier.

Referring now to FIGURES 2 and 4, the second amplifier stage 12 is also provided with a power nozzle 30, a pair of opposed control nozzles 31 and 32, an interaction chamber 33, a pair of output passages 34 and 35, respectively, and a flow divider 36 for splitting the power stream from the power nozzle 30 into the output passages 34 and 35. The amplifier 12 may also be of the boundary layer or stream interaction type as a matter of choice and is provided to increase the gain of a fluid parameter such as mass flow, energy or pressure issuing from the output passages 19 and 20, FIGURE 1, of the first stage 11. The smaller fluid streams from the output passages 19 and 20 are employed to effect amplified directional displacement of the larger fluid stream issuing from the power nozzle 30 of amplifier 12 by means of control nozzles 31 and 32. The ouput fluid signals issuing from the output passages 19 and 20 are essentially linear and must be received as linear flow control streams for use by the control nozzles 31 and 32. It can be seen that the size of the power nozzle, control nozzles, interaction chamber and output passages of the second stage amplifier 12 are considerably greater than the corresponding elements of the amplifier 11 in order to provide a second stage having a considerably larger fluid-handling capability than the first stage. The substantially cylindrical vortex chambers 40 and 41 are positioned in tangential relationship with the sidewalls of the flow splitter 21 forming sidewalls of the output passages 19 and 20 of the amplifier 11, the chambers 40 and 41 communicating with the downstream ends of the passages 19 and 20 through rectangular-shaped ingress ports 42 and 43, respectively. The tangential connection between the output passages of the amplifier 11 and the chambers 40 and 41 through ports 42 and 43, respectively, FIGURE 3, provides a relatively smooth transition from linear to rotational flow in the chambers 40 and 41.

Chambers 40 and 41 are formed by substantially cylindrical cavities in the lower half of the amplifier 11 and in the upper half of the amplifier 12, FIGURE 3. A comparison of FIGURES 2 and 3 clearly illustrates the relative differences in the length of the ports 42 and 43 and the depth of the control nozzles 31 and 32 of the amplifier 12. A pair of cusps 45 and 46 may be respectively formed in designing the chambers 40 and 41 for scooping off predetermined portions of the tangential component of vortical flow in the chambers 40 and 41, the vortical flow being generated by the swirling of fluid downwardly through the vortex chambers. The control nozzles 31 and 32 receive tangential velocity components of vortical flow in the chambers 41 and 40, respectively, and the scooping off of predetermined portions of the tangential velocity component from the fluid rotating in the chambers 40 and 41 is further effected by utilizing the inwardly extending cusps 45 and 46, respectively. The fluid scooped from the vortical streams in the chambers 40 and 46 enters the control nozzles 31 and 32 with a sheet or planar type of flow pattern.

A pair of frusto-conical elements 50 and 51 are provided in the chambers 40 and 41 in order to provide a solid center core for vortical flow in the chambers. The elements 50 and 51 extend substantially the entire length of the chambers 40 and 41, respectively, FIGURE 3, and diverge in the direction of fluid flow through the chambers 40 and 41. In conventional vortex transfer chambers which do not incorporate solid core elements such as the elements 50 and 51, the velocity of the fluid issuing from the control nozzles 31 and 32 varies over the height (as viewed in FIGURES 2, 3 and 5) of the nozzles 31 and 32 because the effect of excess fluid in the chamber has an averaging effect of the signal fluid which increases as a function of length of the path of the fluid through the chamber, the averaging being between the initial velocity of the excess fluid and the initial velocity of the input fluid. By providing a solid core surface that increases in radius in the direction of flow through the transfer chamber, excess fluid is practically eliminated along with its effect on the input signal fluid. The chambers 40 and 41 and the elements 50 and 51 can be designed by those in the art so that substantially all excess fluid is eliminated and the velocity of the fluid issuing from the nozzles 31 and 32 is nearly uniform. Complete uniformity of flow velocity cannot be achieved with a constantly varying signal due to transit time of the fluid through the unit, but the transit time is small and the non-uniformity of velocity has been found to be of little importance, particularly when employing an incompressible fluid.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. Means for transferring fluid from an ingress port at one level to an egress port at a second level, said means comprising a substantially cylindrical chamber having an axis of symmetry, said ingress port positioned to issue fluid tangentially at said one level into one end of said chamber, said egress port constructed to receive the tangential velocity component of fluid egressing from the downstream end of said chamber, the dimensions of said egress port parallel to the axis of symmetry of said chamber being considerably greater than the corresponding dimension of said ingress port, and an element in said chamber extending from the region of said ingress port to the region of said egress port, said element having an axis of symmetry coaxial with said axis of symmetry of said chamber, the annulus between said element and the wall of said chamber being large enough to accept a quantity of fluid sufficient to supply said egress port.

2. The system as claimed in claim 1 wherein said ingress and egress ports are of rectangular cross sections.

3. The combination according to claim 1 wherein said element is a truncated cone having its smallest diameter adjacent said ingress port.

4. The combination according to claim 3 wherein the smallest cross-sectional width of said annulus is approximately equal to the width of said egress port.

5. A two-stage amplifier comprising first and second fluid amplifier units formed such that the second amplifier amplifies fluid signals issuing from the first amplifier, each amplifier including a power nozzle for issuing a defined power stream, plural output passages for receiving the power stream, and at least one control nozzle angularly positioned relative to the power nozzle for issuing a control stream for effecting amplified directional displacement of the power stream relative to said output passages, a substantially cylindrical chamber formed in the structure and having an axis perpendicular to the plane of fluid flow in the amplifiers, means for introducing fluid into said chamber adjacent one end thereof from one of said output passages of said first amplifier so as to induce rotation of fluid in said chamber, and means for extracting fluid from adjacent the other end of said chamber and applying said fluid to a control nozzle of the second amplifier, said chamber including a conically shaped member positioned centrally in said chamber with the surfaces of said member diverging in the direction of flow through said chamber and extending between said means for introducing and said means for extracting.

6. In combination, first and second pure fluid amplifier units of the beam-deflection-type interconnected such that the second unit amplifies the fluid output signals issuing from the first unit, each amplifier including a power nozzle for issuing a defined power stream, plural output passages for receiving the power stream, and at least one control nozzle angularly positioned relative to said power nozzle for issuing a control stream for effecting amplified directional displacement of the power stream relative to said output passages, fluid transfer means for transferring the fluid output signals from the output passages of said first unit to the control nozzles of the second unit, said transfer means including a cylindrical chamber having an axis positioned perpendicularly to the directions of flow in said first amplifier unit, the upstream end of said chamber positioned tangentially with respect to one output passage of said first unit and the downstream end of said chamber positioned tangentially with respect to the control nozzle of said second unit, a cusp formed in said chamber for scooping off a predetermined quantity of the tangential component of the rotating flow into said second control nozzle, and structural means located in said cylindrical chamber for producing a uniform velocity of fluid egressing from said chamber over its length, said means defining a fluid region within said chamber of sufficient size to accept only the quantity of fluid required to supply said control nozzle of said second amplifier unit.

7. In a fluid amplifier system including first and second fluid amplifiers each having at least one output channel and one control nozzle, a fluid transfer means comprising a cylindrical chamber, means for introducing fluid flowing in an output channel of the first amplifier tangentially into said chamber adjacent one end thereof, means for extracting fluid tangentially from said chamber downstream of said means for introducing, and structural means located along the longitudinal axis of said cylindrical chamber for providing a relatively uniform velocity profile along the length of said means for extracting parallel to the longitudinal axis of said chamber.

8. A pure fluid system comprising at least a first and a second pure fluid amplifier arranged in adjacent, generally parallel planes, each of said first and second amplifiers having at least one output channel and at least one control nozzle, a hollow cylindrical chamber having an axis of symmetry perpendicular to and extending between the planes of said amplifiers, means for introducing fluid flowing out of said output channel of said first amplifier tangentially into said chamber adjacent one end thereof, means located downstream of said means for introducing for tangentially extracting fluid flowing in said chamber, means for applying fluid extracted from said chamber to said control nozzle of said second amplifier, and structural means extending between said means for introducing and said means for extracting and lying along the axis of said chamber for developing a relatively uniform velocity along said means for extracting parallel to the axis of said chamber.

9. A pure fluid system comprising at least a first and a second pure fluid amplifier arranged in adjacent, generally parallel planes, each of said first and second amplifiers having at least one output channel and at least one control nozzle, a hollow cylindrical chamber having an axis of symmetry perpendicular to and extending between the planes of said amplifiers, means for introducing fluid flowing out of said output channel of said first amplifier tangentially into said chamber adjacent one end thereof, means located downstream of said means for introducing for tangentially extracting fluid flowing in said chamber, means for applying fluid extracted from said chamber to said control nozzle of said second amplifier, and a frustoconical member located in and coaxial with said chamber and having its smallest diameter located adjacent said means for introducing, said member extending from adjacent said means for introducing to the downstream end of said means for extracting.

10. The combination according to claim 9 wherein the maximum radius of said member is such relative to the radius of said chamber as to provide an annulus having a cross-sectional width approximately equal to the width of said means for extracting.

11. In combination, first and second pure fluid amplifier units of the beam-deflection-type interconnected such that the second unit amplifies the fluid output signals issuing from the first unit, each amplifier including a power nozzle for issuing defined power stream, plural output passages for receiving the power stream, and at least one control nozzle angularly positioned relative to said power nozzle for issuing a control stream for effecting amplified directional displacement of the power stream relative to said output passages, fluid transfer means for transferring the fluid output signals from the output passages of said first unit to the control nozzles of the second unit, said transfer means including a cylindrical chamber having an axis positioned perpendicularly to the directions of flow in said first amplifier unit, the upstream end of said chamber positioned tangentially with respect to one output passage of said first unit and the downstream end of said chamber positioned tangentially with respect to the control nozzle of said second unit, a cusp formed in said chamber for scooping off a predetermined quantity of the tangential component of the rotating flow into said second control nozzle, and an element of substantially frustoconical shape located in said chamber and having an axis of symmetry coaxial with the axis of said chamber, the surface of said element diverging in the direction of translation of fluid through said chamber.

12. In a fluid amplifier system including first and second fluid amplifiers each having at least one output channel and one control nozzle, a fluid transfer means comprising a cylindrical chamber, means for introducing fluid flowing in an output channel of the first amplifier tangentially into said chamber adjacent one end thereof, means for extracting fluid tangentially from said chamber downstream of said means for introducing, and a frustoconical member located along the longitudinal axis of said chamber and having a maximum radius adjacent the end of said chamber remote from said means for introducing fluid to provide an annular space having a radius approximately equal to the width of said means for extracting.

References Cited by the Examiner

UNITED STATES PATENTS

| | | | |
|---|---|---|---|
| 2,701,056 | 2/1955 | Morton | 209—144 |
| 2,725,983 | 12/1955 | Rakowsky | 209—211 |
| 3,171,421 | 3/1965 | Joesting | 137—81.5 |
| 3,207,168 | 9/1965 | Warren | 137—81.5 |

M. CARY NELSON, *Primary Examiner.*

W. CLINE, *Assistant Examiner.*